United States Patent
Lindsey

[11] 3,777,154
[45] Dec. 4, 1973

[54] OPTICAL DATA PROCESSING SYSTEM
[76] Inventor: Richard W. Lindsey, 501 Valencia Rd., Venice, Fla. 33595
[22] Filed: Feb. 7, 1972
[21] Appl. No.: 224,164

[52] U.S. Cl....250/227, 350/96 R, 250/553, 250/578
[51] Int. Cl. .............................................. G02t 1/28
[58] Field of Search ........................ 250/211, 217 SI, 250/220 M, 227; 350/96 R, 96 B

[56] References Cited
UNITED STATES PATENTS

| | | | |
|---|---|---|---|
| 3,353,026 | 11/1967 | Israely | 350/96 B |
| 3,663,822 | 5/1972 | Uchida | 250/217 S |
| 3,169,190 | 2/1965 | Ress | 250/211 R |
| 3,349,406 | 10/1967 | Perry | 250/227 |
| 3,558,895 | 1/1971 | Hartman | 250/227 |
| 3,153,149 | 10/1964 | Finigan | 250/211 |

Primary Examiner—James W. Lawrence
Assistant Examiner—D. C. Nelms
Attorney—Peter P. Price et al.

[57] ABSTRACT

A circuit plane or "board" includes a plurality of optical-micro-circuit device sockets with optical interface windows around the periphery of each socket. Each socket is adapted to receive a wafer or like component which comprises an electrical micro-circuit having optical input and output devices at the periphery of which register with the interface windows of the socket. The windows are optically interconnected with optical interface windows of other sockets or with optical terminals along the edge of the "board" by means of optical fibers embedded in a potting material typically sandwiched between two thermally and electrically conductive plates. Operating power for the circuits is applied to the conductive plates to which the micro-circuits are electrically coupled. A plurality of circuit "boards" so formed can be stacked on one another and optically coupled by means of light transmitting end connectors including optical fibers therein to form a complete data processing system.

14 Claims, 8 Drawing Figures

PATENTED DEC 4 1973 3,777,154

PATENTED DEC 4 1973　　3,777,154

OPTICAL DATA PROCESSING SYSTEM

BACKGROUND OF THE INVENTION

The present invention relates to electro-optical circuits, and specifically, to a circuit board for optically interconnecting a plurality of electro-optical micro circuits.

With the development of medium and large scale integration of logic circuit elements used in data processing systems, the problem of interconnecting the logic elements becomes increasingly difficult to solve. Conventional electrical connection means such as printed circuit boards have become relatively complex and therefore costly. The inherent two-dimensional limitation imposed by the use of only the surfaces of printed circuit boards, severely limits the flexibility of such boards for interconnecting a plurality of integrated circuit devices even when both sides of the board are used.

Another difficulty with the interconnection of various logic circuit elements in an electrically connected circuit board is the reliability of solder joints or wire wrap joints when used. This is particularly acute where "plated-through holes" are used in multi-layer boards. Also, where many solder joints are required, the possibility of damage associated with replacing defective micro-circuits soldered into the printed circuit board is increased greatly when technicians are required to unsolder and disconnect each of the circuits.

Another difficulty is that with conventional electrically coupled micro-circuits, the servicing and troubleshooting to isolate faulty components within a circuit board containing a plurality of such devices requires a highly skilled technician and complicated and relatively expensive test equipment. The optical circuit board of the present invention which optically connects the electrical optical micro-circuits, provides readily-visible optical terminals which will be illuminated in a predetermined manner thereby providing information as to the operability of micro-circuits within the circuit board. Such a system greatly simplifies the troubleshooting and does not require complicated or expensive test equipment.

Another problem with electrically conductive circuit boards conventionally used to interconnect micro-circuits is one of crosstalk caused by inductive couplings between adjacent conductors. The optical circuit paths employed with the apparatus of the present invention constrains the light transmission to optical fiber paths and no crosstalk problem exists. Also, the micro-circuit devices and optical conductors are preferably placed between a pair of conductive plates which serve as shields, effectively shielding the circuits from external noise or other electrical interference.

Finally, in conventional circuit boards, heat is removed from individual integrated circuits by conduction from only one major surface of each of the integrated circuits. In the apparatus of the present invention, however, both surfaces of each of the micro-circuits are in thermal communication with heat conducting surfaces thereby greatly increasing the flow of heat generated within the device away from the micro-circuits.

With the advent of fiber optic technology, some attempt has been made to provide optical interconnections between electrical devices as well as to provide optical logic circuits. U. S. Pat. Nos. 2,833,936, T. I. Ress, issued May 6, 1958; 3,423,594, A. G. Galopin, issued Jan. 21, 1969; and 3,519,116, R. Koehn, issued July 7, 1970 represent some efforts made to employ fiber optics, or other light conductive paths to produce either optical digital circuits or to couple optical fibers to conventional photo electric components. None of these patents suggest, however, the interconnection of a plurality of micro-circuits by means of a circuit board structure including optical sockets therein adapted to receive micro-circuit device wafers, as does the present invention.

SUMMARY OF THE INVENTION

The system of the present invention provides fiber optic paths interconnecting a plurality of micro-circuit devices having light emitting end sensing devices which interface with the optical fibers. A circuit plane or "board" is formed, preferably on a support plate having a layer of potting material thereon containing optical fibers distributed in a predetermined manner to join the various input and output devices of the micro-circuits to form any desired digital circuit configuration. By deploying the optical fibers within the the three-dimensional space of the potting material, a relatively complex interconnection between the devices can be achieved thus avoiding the two-dimensional limitations existing with printed circuit boards.

The circuit "board" includes at least one socket having optical interface terminals or windows formed by ends of optical fibers extending to the socket. An electro-optical device consisting of a wafer, for example, containing an electrical micro-circuit with optical input and output devices, is positioned in the socket such that each input and output device is in optical communication with a predetermined optical interface window of the socket. When a "board" includes more than one socket, optical fibers are employed to interconnect the sockets and therefore the electro-optical devices mounted within the sockets.

The circuit board can include interface terminals on an edge which, when visible-spectrum light frequencies are employed, can provide visual check means for troubleshooting the electrical circuits therein. To aid in servicing the optical-electrical circuit, light interruption means can be provided for gating, for example, digital signals within the board to provide a predetermined visual display at the interface terminal of the circuit board to aid in isolating faulty components within the board.

By employing optical fiber end connectors, a plurality of the circuit boards can be stacked and optically coupled to increase the packaging density of the system so that an entire data system can be formed thereby.

It is an object of the present invention to provide an optical system for interconnecting a plurality of electrical micro-circuits having optical detection and generating means.

It is an additional object of the present invention to provide a data processing system employing a plurality of electro-optical micro-circuits mounted within wafers which are in turn fitted within optical sockets on a circuit board employed with the system.

It is an additional object of the present invention to provide circuit boards for supplying electrical power to electro-optical micro-circuits therein as well as dissipating heat therefrom.

It is a further object of the present invention to provide a circuit board having optical output terminals for visually troubleshooting electrical circuits therein.

These and other objects of the present invention will become apparent upon reading the specification together with the accompanying drawings.

DETAILED DESCRIPTION OF PREFERRED EMBODIMENT

Figure 1:
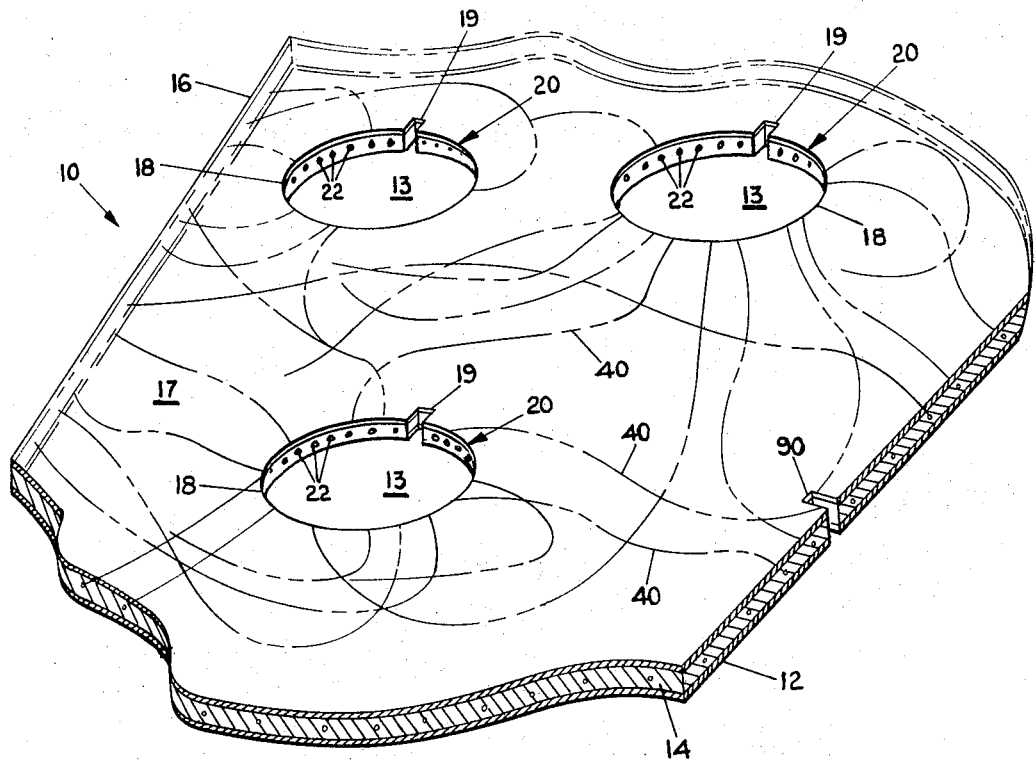
FIG. 1 is a perspective partial view of a circuit board embodying the present invention.
Figure 2:
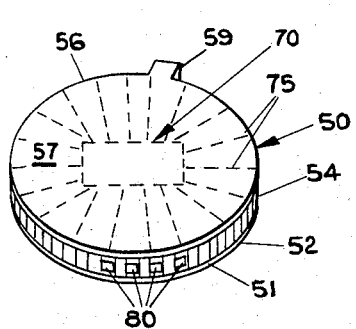
FIG. 2 is a perspective view of a wafer containing a micro-circuit with optical input and output devices and which is adapted to fit within a socket in the circuit board shown in FIG. 1.

Referring now in detail to FIGS. 1 and 2, there is shown a circuit board 10 of the present invention and a micro-circuit wafer 50 which can be mounted within one of the optical sockets 20 on the circuit board 10. The circuit board 10 comprises a base plate 12 of a thermally and electrically conductive material such as copper. A cover may be used as shown in FIG. 1 to provide electrical operating power to the micro-circuits as explained below. Regardless of whether a top plate 16 is used, the base plate 12 preferably has a layer of a potting material 14 such as a resin base epoxy in which a plurality of light-transmitting paths 40 such as optical fibers are positioned. The potting material 14 of the circuit board (and the cover plate 16, if used) includes a plurality of socket-defining apertures 18 which, in one possible embodiment, are generally circular although they can be any desired shape. The apertures may include a keyway 19 and each wafer may include a key 59 such that the wafer can be oriented in the socket in a predetermined manner. Alternatively, the wafers and their sockets may be shape-keyed to one another, and would thus typically be other than circular in shape. The top surface 13 of the base plate 12 is exposed inside the socket 20, as shown in FIG. 1. Around the periphery of each socket 20 is a plurality of optical interface "windows" 22 which comprise ends of the optical fibers 40 which are disposed within the layer of potting material or between the base and top plates 12 and 16 respectively.

Each wafer 50 includes therein an electrical microcircuit 70 which has electrical leads 75 leading to input and output optical devices 80 spaced around the periphery of the wafer. The input and output devices may include photo-transistors and light emitting diodes respectively as well as other light detecting and generating devices. When a wafer is inserted in a socket each input and output device 80 will align with a predetermined optical window 22 of the socket. Each wafer 50 includes a conductive contact 52 on the bottom thereof which may form a base for the wafer. The base so formed has a bottom surface 91. An upper (top) conducting plate 56 with an outer surface 57 forms the top of the wafer and a potting material 54 similar to the potting material 14 employed with the circuit board 10 of FIG. 1 may be used to fill the space between members 52 and 56. The micro circuit 70 may, for example, be suspended in the potting material 56, along with electrical conductors 75 coupling the optical input and output devices to the micro-circuit. Of course, it is to be understood that the specific form of the micro-circuits or wafers used to implement the invention may vary widely from one application to another, depending upon the particular requirements involved and the preferences of the micro-circuit designer. Thus, the foregoing remarks relative to the particular structure of the wafers 50 shown are merely for purposes of illustration, to show in a very general manner the general nature of micro-circuits to be used in practicing the invention.

The circuit board 10 of FIG. 1 and the wafer 50 shown in FIG. 2 can be constructed in any desired manner, it being necessary only that the optical windows 22 of the sockets 20 are in alignment with the optical input and output devices 80 of the wafer 50. Likewise, any desired shape can be employed for the socket 20 so that the wafers 50 will fit within the sockets in a manner to provide optical coupling between the input and output devices 80 and predetermined optical windows 22 of the wafer and socket respectively. The base plate 12 of the circuit board 10 and the base plate 52 of the wafer 50 (as well as the cover plate 16, if used, and the top plate 54 of the wafer) are electrically and thermally joined by physical pressure once the wafer 50 is positioned within the socket 20. A thin conducting strip 120 (FIG. 7) can be employed to assure electrical coupling between the wafer and the cover plates 52 and 54. If only a support plate is used, no interconnections 120 are necessary. If no cover plate 16 is used in the circuit board, the top plate 54 of the wafer will normally make contact with the underside of the base plate 12 of the next vertical circuit board stacked above, or with a similar plate constituting an end terminal of a stack of the boards. Surface 13 of the bottom plate 12 will contact the bottom surface 51 of the base contactor plate 52 of the wafer once the wafer is installed in the socket.

One manner in which the circuit board can be manufactured is illustrated in FIGS. 3 through 6, which will now be discussed.

Figure 4:
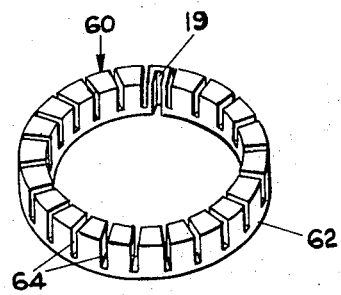
FIG. 4 is a perspective view of a socket guide employed in the present invention.
Figure 5:
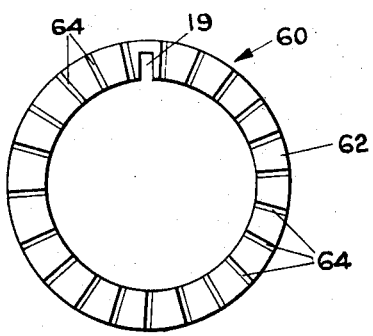
FIG. 5 is a plan view of the socket guide shown in FIG. 4.

To facilitate the orientation of the optical windows 22 of each socket 20, guide rings 60 shown in detail in FIGS. 4 and 5 are cemented to the top surface 13 of the base plate 12 prior to threading the optical fibers onto the board. The circular guide rings 60 comprise an annular member 62 having a generally rectangular cross section. Member 62 includes a plurality of peripherally spaced notches 64 which define the window boundaries for the optical sockets. Each guide ring 60 further includes a keyway 19 (FIGS. 1, 3, 4 and 5) which is adapted to receive the key 59 (FIG. 1) of a wafer.

Figure 6:
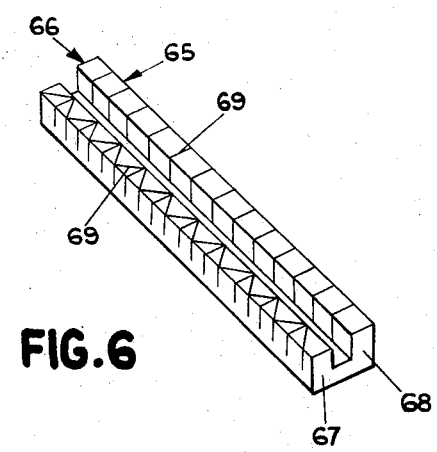
FIG. 6 is a perspective view of an edge guide employed with the present invention.
Figure 3:
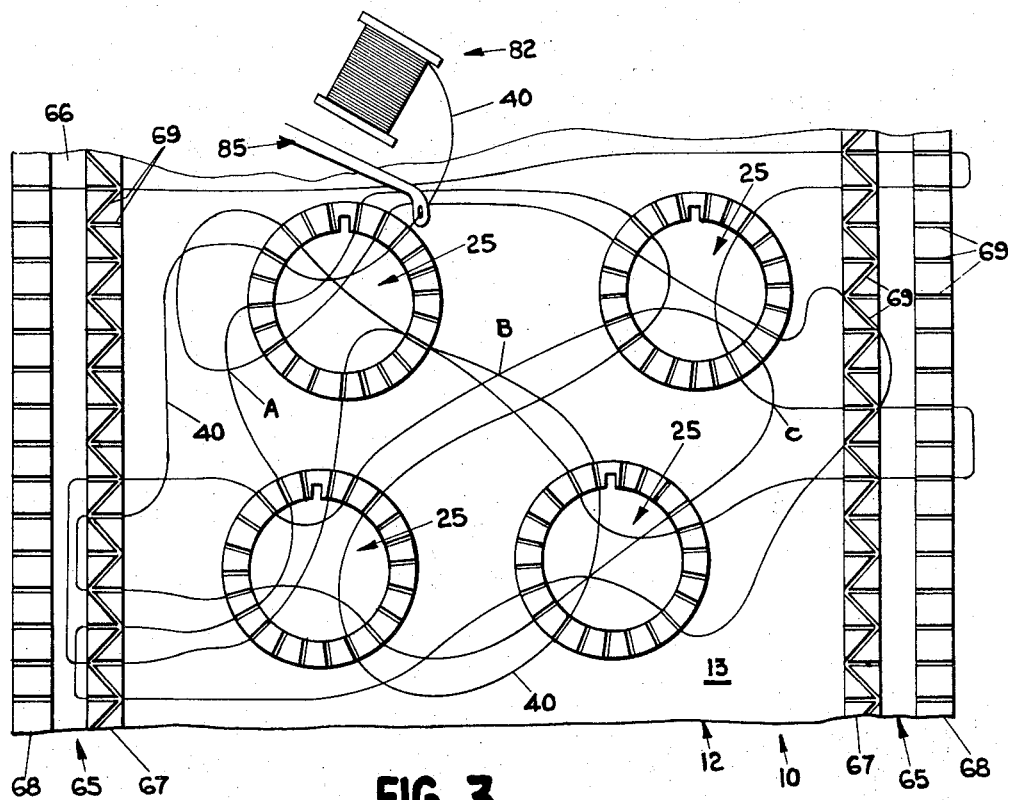
FIG. 3 is a partial plan view of a circuit board embodying the present invention shown during manufacture.

End guides 65 shown in detail in FIG. 6 are also employed at the edges of each circuit board 10 so that the boards can be optically interconnected with other circuit boards, when external interface equipment, or can provide a visual display for troubleshooting as described below if visible light frequencies are used. Each end guide 65 comprises a member 66 with upwardly extending guide bars 67 and 68 each of which has notches 69 as shown in FIGS. 3 and 6 to provide guides for the optical fibers 40. The notches 69 of the end guides 65 as well as the notches 64 of the ring guides 60 are sufficiently wide and deep to accommodate the optical fibers 40 and hold them in a predetermined position during the manufacturing of the circuit board and once the circuit board is completed. Thus, a circuit board 10 will have end guides as well as a plurality of ring guides secured thereto before the optical fiber 40 is threaded through the various notches of the guides.

As seen in FIG. 3, the optical fibers 40 are threaded with a single continuous optical fiber from a supply spool 82 of such fiber by means of a mechanical shuttle apparatus represented in FIG. 3 by the guide needle 85. It is understood that by choosing a standard size circuit board and a predetermined array of ring guides and end guides thereon, computer controlled automatic shuttle guide means can be employed to provide a desired pattern of optical fibers 40 through the various notches 64 of the ring guides 60 and 69 of the end guides 65 thereby forming circuit connections between the electro-optical micro-circuits mounted on the board. Likewise, individual prototype circuits can be fabricated by manually threading the optical fiber through the various guides.

After the optical fiber 40 has been interwoven through the various guides in a predetermined desired manner, the potting material 14 (FIG. 1) is applied to encapsulate the optical fiber, securing it in position. At this time the top plate 14 (FIG. 1) may be positioned over the potted optical fiber and base plate 12 if used. Once the potting material has cured, the potting material and optical fibers within the central portion 25 (FIG. 3) of each socket area is cut away with a suitable cutting instrument shaped to conform to the inner dimensions of the ring guides 60. The resulting structure is the circuit board shown in FIG. 1. The sheared ends of the optical fiber 40 form the windows 22 of the sockets. It is seen that by employing a single continuous optical fiber 40 which can be interwoven as described, the optical fibers cross one another as for example at points A, B, C and etc. (FIG. 3) without optically interferring with each other thereby allowing a relatively complex three-dimensional interconnection structure not available with conventional two-dimensional printed circuit boards.

Although no specific internal construction for the wafers 50 is critical to the invention, it is merely pointed out that each wafer 50 can be manufactured in a manner similar to that of the circuit boards, i.e., by employing a guide ring having an outer diameter somewhat smaller than the guide rings 60 employed for the sockets and which have notches spaced in peripheral alignment with the corresponding notches 64 in the socket rings 60. The photoelectric devices 80 (FIGS. 1 and 7) such as photo-transistors and light-emitting diodes will therefore be peripherally spaced around the wafer as shown in FIG. 2 such that their light-emitting or light sensitive surfaces are immediately adjacent an interface window 22 (FIG. 2) of a socket. Devices 80 may operate within the visible light spectrum or not as long as correspondingly coupled devices are compatable in frequency response or emission.

Figure 7:
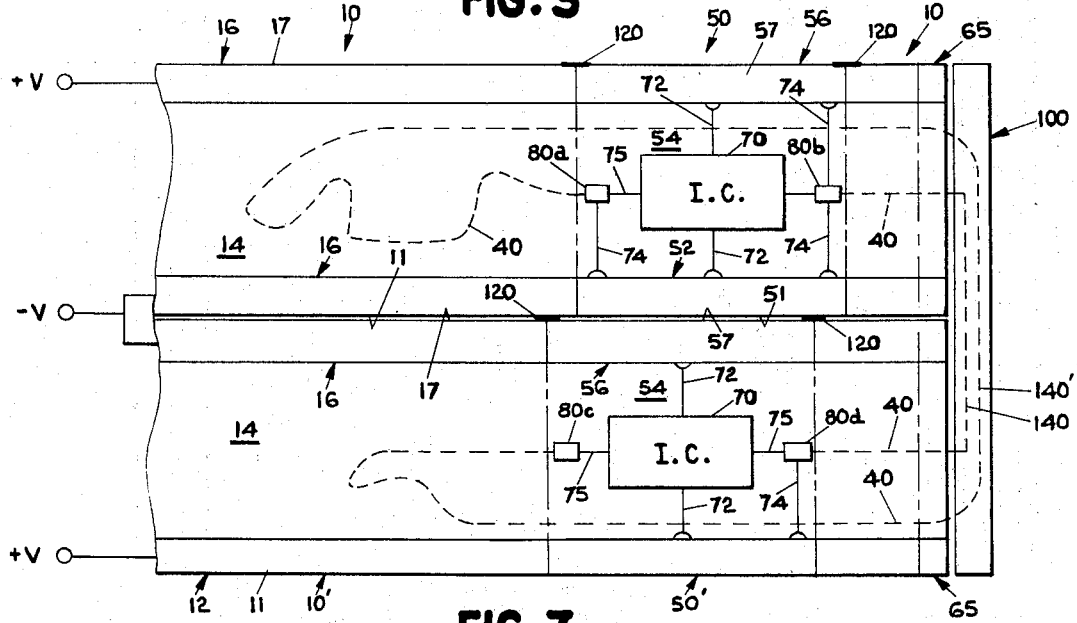
FIG. 7 is a schematic side elevational view partially in block diagram form showing the stacking of two circuit boards of the present invention together with an optical end connector coupling the two boards.

Purely for purposes of illustration, one possible construction of individual wafers with the micro-circuits and input/output devices therein is shown schematically in FIG. 7 which also illustrates the typical stacking of a one circuit board 10 on a second circuit board 10', wherein each has both an upper and a lower plate 12 and 16. An optical end connector 100 optically couples the two circuit boards. Each wafer includes a pair of conducting members 52, 56 such as plates between which are mounted the micro-circuit and input/output devices held in predetermined fixed positions by potting material 54 which fills the space between plates 52 and 56. As noted above, wafer guides (not shown) can be employed during manufacture of each wafer to facilitate positioning of the input/output devices 80.

As seen in FIG. 7 plates 12 and 16 of each circuit board are electrically coupled to a source +V and —V of operating potential. The voltage on the plate of each of the circuit boards is applied to the bottom plate conducting surfaces 56 and 52 of the wafers mounted in the sockets by means of the junction members 120 which as described above can be thin conducting strips which electrically join the conducting surfaces of the cover plate of the circuit board (when used) with the corresponding aligned surface of the wafer. A micro-circuit 70 such as an integrated circuit (IC) is shown in each of the wafers 50 and 50' and two optical input and output devices are coupled to each of the integrated circuits. It is understood that many such input/output devices can be associated with each IC and a wafer may include more than one IC. It is also understood that instead of using top and bottom plates for each circuit board, a single plate of the junction of two boards will suffice for supplying electrical power to both boards and removing heat therefrom. Indeed, for that matter, optical circuit planes or "boards" in accordance with the board concepts of the invention need not specifically name either of the outer support plates if the latter are for any reason not desired. That is, the optical fibers may be supported in their plane in practically any desired manner, such as for example by being embedded within an otherwise monolithic layer of potting compound, or the like, defining the desired wafer sockets. In such an arrangement, conductive members may be suspended within the plane, just as are the optical fibers, although heat transfer means of some sort will of course normally be desired. Alternatively, the layer of potting compound formed on a support plate need not be uniformly thick to form a regular plate, since all that is required is that the optical fibers be securely retained with respect to the micro-circuit sockets, the geometry of the package being for the most part immaterial, except to the extent that the sockets and the top and bottom surfaces of the micro-circuits are not obscured or covered.

Electrical operating power supplied to the plates of the circuit boards is applied to each of the integrated circuits 70 by means of power leads 72 which extend from the integrated circuits to the inner surfaces of the conducting plates 52 and 56 of each wafer to electrically contact these plates thereby applying the +V and —V voltages to the integrated circuits. Leads 72 may, for example, be ribbon leads which extend through the potting material 54 and are joined to the conducting surfaces of the wafer by means of a conducting epoxy or other suitable means to insure an electrical contact thereto. Likewise, the input and output devices 80a, 80b, and 80d shown in FIG. 7 have power leads 74 (as required) which are coupled to the conducting plates of the wafer to receive operating power. Some input and output devices such as device 80c may not require operating power and therefore no connections are necessary.

The optical end connector 100 shown in FIG. 7 includes a plurality of optical transmission means 140 such as optical fibers which are positioned in the connector 100 such that ends of the optical fibers 140 are immediately adjacent ends of optical fibers within the edge connector 65 and light can be transmitted between the adjacent fibers. Thus, the device 80b in wafer 50 is optically coupled to the device 80d in wafer 50' via the end connector 100. Likewise an optical fiber 40 having a window forming end adjacent input-/output device 80a extends through the board 10 and optically couples device 80a to device 80c in wafer 50' via another optical path 140' in end connector 100. The connector 100 can be manufactured in any desired manner and may include guides similar to edge guides 65 (FIG. 6) as well as potting material to encapsulate the plurality of optical fibers therein.

Each of the circuit boards may include a plurality of wafers which are interconnected to other wafers on the same board as illustrated in FIG. 1 as well as interconnected to wafers on other stacked boards by means of end connectors 100 as illustrated in FIG. 7. By employing transistor-transistor-logic (TTL), diode-transistor-logic (DTL), or other digital integrated circuits 70, and by interconnecting the circuits optically as described herein, a complete data processing system can be constructed within a relatively small space by stacking several of the circuit boards using an end connector 100 to interconnect the boards.

Figure 8:
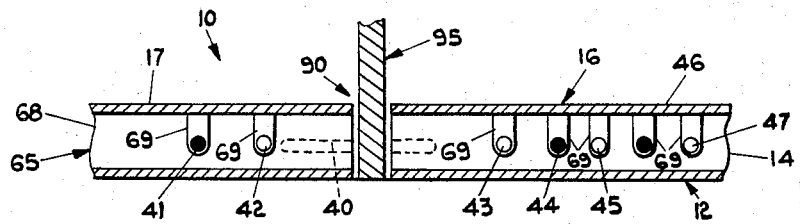
FIG. 8 is a side elevation view partially in cross section of a light interrupting notch in the circuit board shown in FIG. 6.

One feature of the circuit board of the present invention is that an edge of each of the "boards," separate from the edge interfacing the optical end connectors, can include a plurality of optical fiber ends such as shown in FIG. 8 which are in a predetermined state of illumination (during the operation of the electrical circuitry therein) when visible light frequency devices are utilized. Referring in detail to FIG. 8 there is shown an edge of a typical circuit board 10 which has an edge guide 65 thereon with a plurality of notches 69 supporting optical fiber ends 41 through 47 therein. Proper operation of the circuits on the board can be checked visually in the following manner.

If for example the circuit board IC circuits comprise a counter, the optical fiber ends 41 and 42 (FIG. 8) can be coupled to input terminals of the counter while optical fiber ends 43 through 47 are coupled to output terminals. When light is directed to one of the ends 41 or 42 by test equipment or by an operator with a light source such as a pen light, predetermined output optical fibers will be illuminated if the circuit is operating properly. In FIG. 8 for example with fiber end 42 illuminated output fiber ends 43, 45 and 47 should be illuminated if the circuitry within the board is functioning. If the array of output optical fibers are not in a state of illumination which indicates proper operation of the circuits on the board, the operator testing the circuit can trace the faulty component to a particular wafer by visually determining the state of illumination of the output terminals or by using optical test instruments coupled to the edge of the board to accomplish this; and by referring to a troubleshooting guide or circuit diagram. In such a system therefore, no complicated test instruments for measuring circuit voltages or currents are necessary, and relatively unskilled personnel can isolate and replace a wafer having a faulty circuit component.

To aid in troubleshooting such electrical-optical circuits, light interrupting slots 90 (FIGS. 1, 3 and 8) can be formed at predetermined locations on the circuit board 10 by cutting away a portion of the encapsulating material and specific optical conductor to provide an aperture which, when unobstructed, allows the transmission of light thereacross. An opaque instrument 95 shown in FIG. 8 can be inserted in the slot 90 to obstruct the light path thereby causing a predetermined desired circuit response which can serve as a troubleshooting guide for locating faulty electrical components in the system. Thus instead of illuminating an input terminal, predetermined one or more light interrupting slots can be blocked as shown in FIG. 8 to provide illumination of output optical fibers which indicate to testing personnel or instruments, the operating condition of the circuitry on the board or boards. In some systems both light interrupting slots and input optical fibers can be used in a sequence to isolate faulty circuit components. The light interrupting slots are approximately one millimeter wide to allow the transmission of nearly all of the light thereacross when an opaque tool 25 (FIG. 8) is not obstructing the slot. Dust covers can be placed over the slots when the circuit is in operation to insure that foreign matter does not obstruct the light transmission path and interfere with the circuit operation.

It will become apparent to those skilled in the art that the invention can be embodied in many variations different than the preferred embodiment described herein which is illustrative of the invention as defined by the appended claims.

The embodiments of the invention in which an exclusive property or privilege is claimed are defined as follows:

1. A circuit board apparatus for optically coupling electro-optical circuit devices comprising:
   means defining first and second surfaces in spaced relationship,
   means for holding an electro-optical device with at least portions of said device between said first and second surfaces,
   at least one optical interface window disposed between said surfaces and positioned to be aligned with said device when said device is so held,
   an optical terminal coupled to said surface-defining means, and
   optical transmission means located between said first and second surfaces and coupled from said optical interface window to said optical terminal.

2. The circuit board of claim 1 including at least two of said device-holding means, at least one optical interface window for each device held by said two means, and optical transmission means optically coupling one such window to another such window.

3. The circuit board of claim 2 wherein said optical transmission means comprise optical fiber.

4. The circuit board as defined in claim 3 wherein said means for holding an electro-optical device comprises sockets having a plurality of spaced optical interface windows for transferring optical information between said electro-optical devices mounted in said sockets and a plurality of optical fibers ending at said windows.

5. The circuit board as defined in claim 4 wherein at least one of said means defining said first and second surfaces comprises an electrically conductive plate.

6. The circuit board as defined in claim 5 and further including a layer of potting material carried on said plate to rigidly hold said optical fiber in place.

7. The circuit board as defined in claim 6 wherein each socket includes a socket guide having at least one notch for receiving an optical fiber at a predetermined position on the periphery of said socket.

8. The circuit as defined in claim 7 wherein each optical interface window is located at a notch in said socket guide and comprises an end of an optical fiber.

9. An optical data processing system comprising:
a circuit board including a plurality of optical sockets interconnected in a predetermined manner by optical fibers, and
circuit wafers shaped to fit within said optical sockets and including electrical micro-circuits having electro-optical input and output devices electrically coupled to said micro-circuits and optically coupled to said interconnecting optical fibers when said wafers are mounted in said sockets.

10. The system as defined in claim 9 wherein said circuit board comprises a conductive plate and said optical fibers are positioned above said plate.

11. The system as defined in claim 10 wherein each wafer includes at least a bottom conductive surface which is electrically and thermally coupled to said plate of said circuit board when said wafer is mounted thereon to provide electrical power to circuits within said wafer.

12. An optical data processing system comprising:
a first circuit board including a plurality of optical sockets interconnected in a predetermined manner by optical fibers and further including at least one optical input and output terminal,
circuit wafers shaped to fit within said optical sockets and including electrical micro-circuits having electrical-optical input and output devices electrically coupled to said micro-circuits and optically coupled to said interconnecting optical fibers when said wafers are mounted in said sockets,
a second circuit board including a plurality of optical sockets interconnected in a predetermined manner by optical fibers and further including at least one optical input and output terminal,
circuit wafers shaped to fit within said optical sockets of said second circuit board and including electrical micro-circuits having electrical optical input and output devices electrically coupled to said micro-circuits and optically coupled to said interconnecting optical fibers when said wafers are mounted in said sockets, and
an optical connector including optical fibers therein coupling said input and output terminals of said first circuit board to said output and input terminals respectively of said second circuit board.

13. The system as defined in claim 12 wherein each of said first and second circuit boards comprises a pair of spaced conductive plates and said circuit boards are stacked upon one another such that one of said plates of said first circuit board contacts one of said plates of said second circuit board.

14. An electrical-optical circuit adapted to fit within an optical socket having a plurality of light transmission means coupling said socket to other optical sockets, said circuit comprising:
an electrical micro-circuit,
electrical-optical input and output devices electrically coupled to said micro-circuit,
a pair of spaced conductive surfaces shaped to fit in said optical sockets, said micro-circuit and said devices fitted between said conductive surfaces, and oriented such that light-responsive surfaces of said devices are arranged in a predetermined array adjacent and in alignment with light transmission means of said optical sockets,
electrical leads coupling power input terminals of said micro-circuit and said devices to said conductive surfaces, and
means for applying operating power to said surfaces.

* * * * *